Jan. 29, 1963 L. J. FAY 3,075,818

EQUIPMENT ENCLOSURE STRUCTURE

Filed Aug. 17, 1960 3 Sheets-Sheet 1

INVENTOR.
Lawrence J. Fay
BY
Hill, Sherman, Meroni, Gross & Simpson
ATTORNEYS

Jan. 29, 1963 L. J. FAY 3,075,818

EQUIPMENT ENCLOSURE STRUCTURE

Filed Aug. 17, 1960 3 Sheets-Sheet 2

INVENTOR.

Laurence J. Fay

BY

Hill, Sherman, Meroni, Gross & Simpson

ATTORNEYS

Jan. 29, 1963

L. J. FAY 3,075,818

EQUIPMENT ENCLOSURE STRUCTURE

Filed Aug. 17, 1960

3 Sheets-Sheet 3

INVENTOR.
Lawrence J. Fay
BY
Hill, Sherman, Meroni, Gross & Simpson
ATTORNEYS 3,075,818

EQUIPMENT ENCLOSURE STRUCTURE

Lawrence J. Fay, Elgin, Ill., assignor to Equipto Electronics Corporation, Naperville, Ill., a corporation of Illinois Filed Aug. 17, 1960, Ser. No. 50,226
17 Claims. (Cl. 312—257)

The present invention relates generally to a new and improved enclosure or cabinet and more particularly to an enclosure or cabinet which is particularly adapted for receiving various types and sizes of equipment, such as medical, computing, transmission, supervisory data, radio, television or other electrical or control equipment.

In the past a number of different types of enclosures have been developed for the receipt of various types of equipment. These former types of enclosures have not been entirely satisfactory for a number of reasons. One important reason why former enclosures have not been entirely satisfactory is that the frame structure when subjected to the load of the equipment has not been able to properly support the equipment and resist torsional twisting and movement.

In view of the foregoing, an important object of the present invention is to provide a new and improved enclosure frame which is better able to resist torsional twisting and movement when the equipment is mounted in the enclosure.

Another reason why earlier types of enclosures have not been entirely satisfactory is that the components of the enclosure have not been manufactured and constructed in the simplest possible manner.

Accordingly, another important object of the present invention, is to provide an enclosure comprised of a minimum of simple prefabricated parts that can be manufactured at the lowest possible cost and which may be assembled together with a minimum of effort.

Still another important object of the present invention is to provide a new type of enclosure comprised of a minimum number of standardized parts.

Still another object of the present invention is to provide a new type of enclosure which is strong and lends itself for use in modular enclosure systems.

A further object of the present invention is to provide an enclosure having simple lines and an attractive appearance.

In the past, it has not been readily possible to convert conventional types of cabinets so that they could be rendered moisture proof, dust proof, and the like. In view of the improved construction of the instant enclosure, it may be very readily rendered moisture proof and dust proof through the installation of suitable gaskets or sealing means. Accordingly, a further object of the present invention is to provide a new type of enclosure which may be readily rendered dust and moisture proof, if desired.

Yet another object of the present invention is to provide a novel enclosure having a number of basic elements which may be economically mass produced and which may be easily and rapidly assembled in many different combinations and arrangements so as to accommodate various types of equipment.

In accordance with the general features of the present invention, there is provided an enclosure for equipment to be mounted therein, the enclosure having an enclosure frame including upright corner frame members spaced apart and disposed generally in parallel planes, the upright corner frame members extending about the sides, top and bottom of the enclosure, and transverse frame members disposed between the upright corner frame members in assembly therewith. The frame members are hollow and each have diverging side frame portions open at an inner corner which corner is further defined by outer and inner pairs of angular relatively narrow stepped flanges generally at right angles to each other with one of said pairs of angular relatively stepped flanges being connected to the side frame portions, the outer pairs of the narrow stepped flanges on the upright corner frame members and transverse members defining a seat for edges of the cabinet panel, the inner pairs of angular relatively narrow stepped flanges on said upright and transverse frame members at the enclosure frame corners of the frame being fitted together and comprising means by which the upright and transverse frame members are secured together so as to be substantially free of torsional twisting and movement out of normal planes.

Other objects and features of the present invention will more fully become apparent in view of the following detailed description taken in conjunction with the accompanying drawings illustrating therein several embodiments, and in which.

Figures 1, 2:
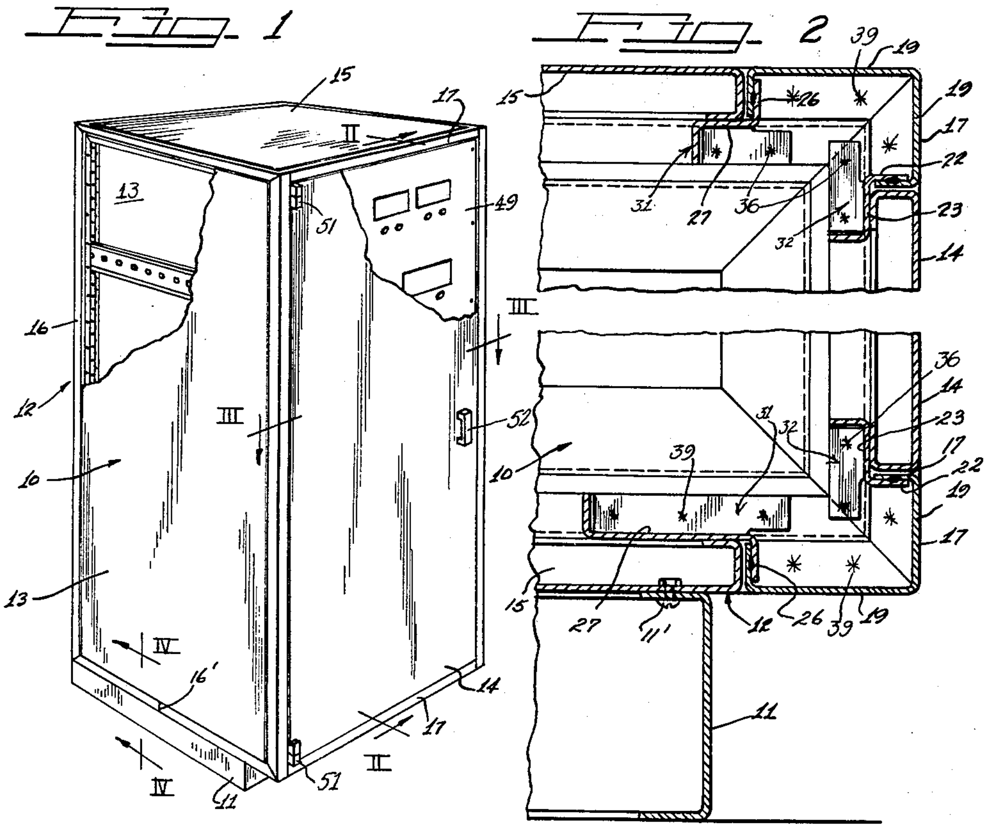
FIGURE 1 is a perspective view showing a basic unit or enclosure incorporating the features of the present invention.
FIGURE 2 is an enlarged fragmentary cross-sectional view taken along the line II—II looking in the direction indicated by the arrows, as seen in FIGURE 1.

Referring now more specifically to the drawings wherein like parts are designated by the same numerals throughout the various figures, an enclosure or cabinet 10 embodying the principles of this invention is most clearly shown in FIGURE 1. The enclosure or cabinet 10 includes a base assembly 11 and an enclosure frame 12. The frame 12 is shown provided with side panels 13, a side or door panel 14, and top and bottom panels 15 which all may be applied to the frame structure in any suitable manner. The base assembly 11 is illustrated as being bolted to the bottom panel 15, as indicated at 11' in FIGURE 2. Similar suitable fasteners may be used to secure the other panels in assembly with the frame 12. If desired, the side panels may be secured at the bottom ends to the frame by means of pins and sockets. Where this system is used, latches may be used at the top of the panels to secure the ends of the panels with the frame 12. In this way, the side panels may be readily removed and a door panel may be substituted in place of a side panel, if desired.

When the aforesaid panels are in assembly with the frame, it will be noted that they are preferably substantially flush with the frame so that the lines of the enclosure may be maintained simple and so that a series of the enclosures 10 may be disposed in side by side relationship and in engagement with one another. If desired, the panel may be offset slightly outside of the outer planes of the frame 12.

The enclosure frame 12 includes identical upright corner frame members 16 which are spaced transversely apart and disposed generally in parallel planes. The upright corner frame members extend about the sides, top and bottom of the enclosure frame 12. The enclosure frame 12 further includes transverse frame members 17 which are disposed between the upright corner frame members 16, with the frame members 16 and 17 being secured together in an improved way in accordance with certain features of the present invention. Each of the frame members 16 comprises a hollow channel and is a one-piece strip which may be made from any suitable material such as steel, aluminum and the like by rolling the material or extruding the material. Opposite ends of the strip may be secured in any suitable manner such as by welding them together at the bottom, center or at one of the corners. Where the strip is welded at one of the corners, it will be appreciated the other three corners of the strip are formed by notching the upright corner frame member 16 so that it may be folded and secured in rectangular form. As illustrated, in FIGURE 1, the ends of the tubular member are welded at 16' so the tubular frame member 16 may be more readily formed into rectangular shapes.

The frame members 16 and 17 include diverging side upright frame portions or sides 18 and diverging side transverse frame portions or sides 19. The upright and transverse frame members or sides 16 and 17 further include outer pairs of angular relatively narrow stepped flanges 20 and 21 on the upright frame portions and outer pairs of angular relatively narrow stepped flanges 22, 23 on the transverse frame portions. The upright and transverse frame members 16 and 17 still further include inner pairs of angular relatively narrow stepped flanges 24, 25 on the upright frame portions and inner pairs of angular relatively narrow stepped flanges 26, 27 on the transverse frame portions. The terms inner and outer, as referred to above, refer to the relative position of the previously described flanges with respect to the upright plane of the member 16 and the transverse plane of the transverse frame member 17.

The upright frame member has a welding flange 28 disposed at right angles to the upright flange 25 and it will further be noted that the flanges 18, 24 and 25 provide a series of steps on the one side of the upright while the flanges 18, 20, and 21 form a series on another side of the upright.

The transverse frame member 17 corresponds generally in cross-section to the upright frame member 16 and in this respect is provided with a transverse outer flange 29 connected with flange 27, and a transverse outer flange 30 connected with the flange 23. The stepped flanges 26, 27, and 29 and the stepped flanges 22, 23, and 30 are provided on substantially identical transverse angles 31 and 32. The angles 31 and 32 are suitably secured to side flanges **19*a*, 19*a* on the inner and outer sides of the transverse frame member 17** such as by welds and the like.

The opposite ends of the angles are provided with transverse welding flanges 33 and 34 which are integral with angle flanges 29 and 30. These flanges are adapted to be secured to upright frame member flange 35 by means of welds 36.

Each of the transverse frame members are provided at opposite ends with end transverse welding flanges or end closure flanges 37 and 38 which are adapted to be secured to upright frame member 24 by means of welds 39. The flanges 33 and 34 are inset relative to the flanges 37 and 38 for the flanges 37 and 38 are disposed in overlapping relation to the flanges 33 and 34 and the upright flanges 25 and 35 when the upright and transverse frame members are in welded assembly.

In view of the foregoing, it will be appreciated the juncture between the upright and the transverse members 16 and 17 is reinforced due to the lapped engagement of the members 16 and 17 and more particularly due to the lapped engagement of the upright flanges 24, 25, and 28 with the transverse flanges **19*a*, 19*a*, 33, 34, 37, and 38. The above noted flanges are advantageously positioned in a stepped relationship so that members 16 and 17 may be attached together in such a way so as to be better able to resist torsional twisting of the members 16 and 17 when the enclosure is loaded. In view of the foregoing, it will now be appreciated that the metal frame 12 is rigidified since it has a series of lap-type joints disposed at the junctures of the upright and transverse metal frame members 16 and 17 at the eight corners of the metal frame 12. The lap joints include double sets of the welding flanges 33, 34, 37, and 38 disposed in spaced parallel planes on the transverse members 17 for attachment with spaced offset flanges 24 and 25 on the upright member 16**.

The upright frames 12 each have notched or split areas 40 and 41 so that each of the frames 12 may be formed from a single continuous piece of material. The notched or slit area 40 cuts through the side flange 18 and the flanges 20 and 21, while the notched or slit area 41 cuts through the flanges 24, 25, and 35, leaving one of these sides or side flanges 18 without a slit. This unslit side 18 provides the common link joining the vertical and horizontal components of the frame 12 in unitary relation. The transverse members are each also slit at opposite ends thereof to permit the welding flanges 37 and 38 to be turned in angular relation to the sides 19, 19.

A series of transverse struts or hanger members 43 are secured at opposite ends to the upright frame flanges 21 by means of a series of strut fasteners 44. The upright flanges 21 each have a series of vertically spaced holes **21*a* and the struts also have vertically spaced holes for alignment with the upright holes 21*a*. Any suitable fastener may be used for securing these struts 43 with the upright flanges 21 and nut and bolt assemblies are illustrated as the means for attaining this end. These struts 43 may be moved to different vertical positions with respect to a flange 21 since a number of holes are provided on the flange 21 to permit the struts to be attached to the flange 21** at various points along the vertical extent thereof.

A series of longitudinal or upright angles 45 having angle flanges 46 and 47 are provided for assembly with the struts 43. Each of the angles has a series of vertically spaced angle holes **45*a* on the angle flange 46 and a series of vertically spaced angle holes 46*b* on the angle flange 47. A series of angle fasteners 48 are provided for securing the angles in assembly with the struts. To attain this end, the angle fasteners extend through the strut holes 43*b* and the angle holes 45*a***.

An equipment panel 49 is provided and has a series of equipment panel fasteners 50 extended through equipment panel holes **50*a* and through angle flange holes 45*b*. If desired, the equipment panel 49 may be disposed at the forward edge of the cabinet so that the continuous flange 35 is disposed at the margin of the equipment panel 49. Now when the panel 49 is disposed in this position, the flange 35 acts as a closure flange to prevent dirt and the like from entering the cabinet. Suitable equipment may be mounted on the equipment panel including dials, knobs, etc. both on the front and rear sides thereof. The equipment panel 49 may be moved with respect to the struts 43 into various adjusted positions by disengaging the angle fasteners 48 from the struts and then re-attaching the angle fasteners 48 in other strut holes 43*b* which are provided along the length of the struts 43**.

It will be appreciated that the door 14 comprises optional equipment since in some installations it may not require a door. It will further be appreciated that since the door panel is identical in size to the side panels that the door panels and the side panels are all interchangeable and may be substituted for one another, if desired. As illustrated, the door 14 is connected to the frame 16 by means of hinges 51. The door 14 is also provided with a latch type handle structure indicated generally at 52 in FIGURE 1.

Figure 3:
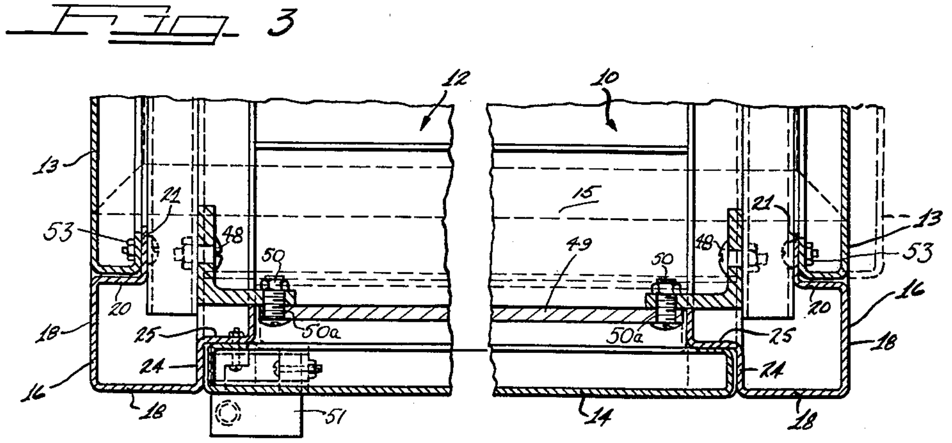
FIGURE 3 is an enlarged fragmentary cross-sectional view taken on the line III—III looking in the direction indicated by the arrows, as seen in FIGURE 1.

If desired, the panels 13 and 15 may be bolted to the frame 12 by means of panel fasteners 53, as shown in FIGURE 3 in which case it will not be necessary to use a latch disposed along the top of the side panels 13, as previously described.

Figure 7:
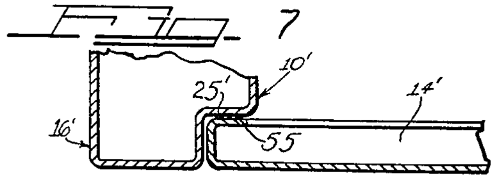
FIGURE 7 is a fragmentary cross-sectional view of a modified type of enclosure.
Figure 4:
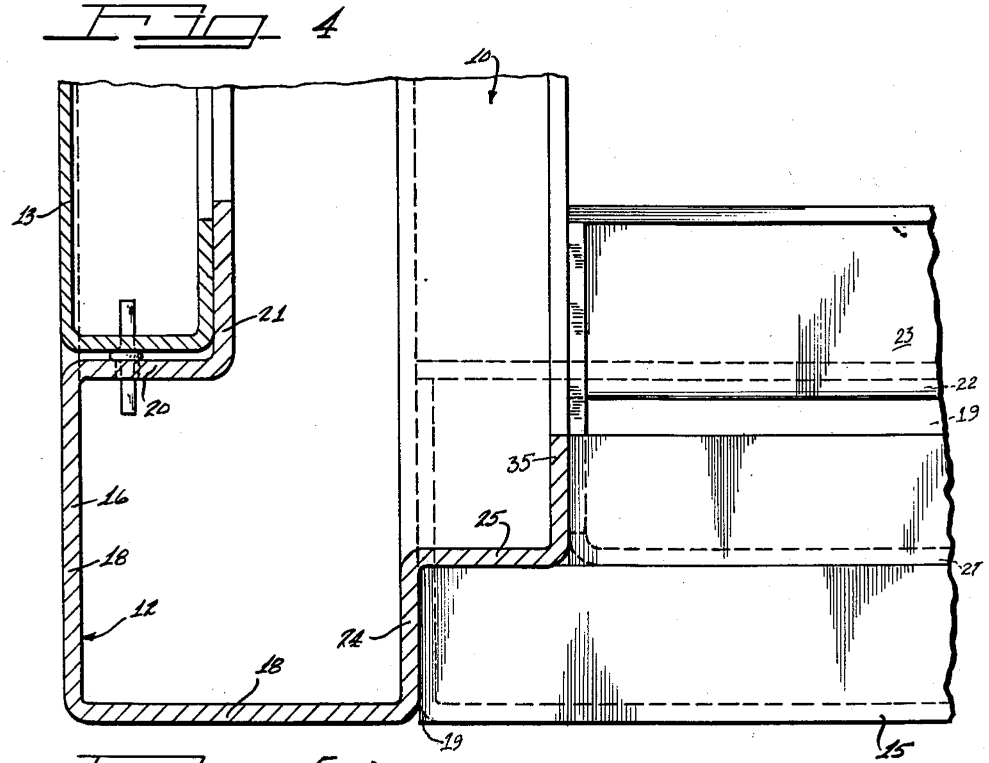
FIGURE 4 is an enlarged fragmentary cross-sectional view taken on the line IV—IV looking in the direction indicated by the arrows, as seen in FIGURE 1.
Figure 5:
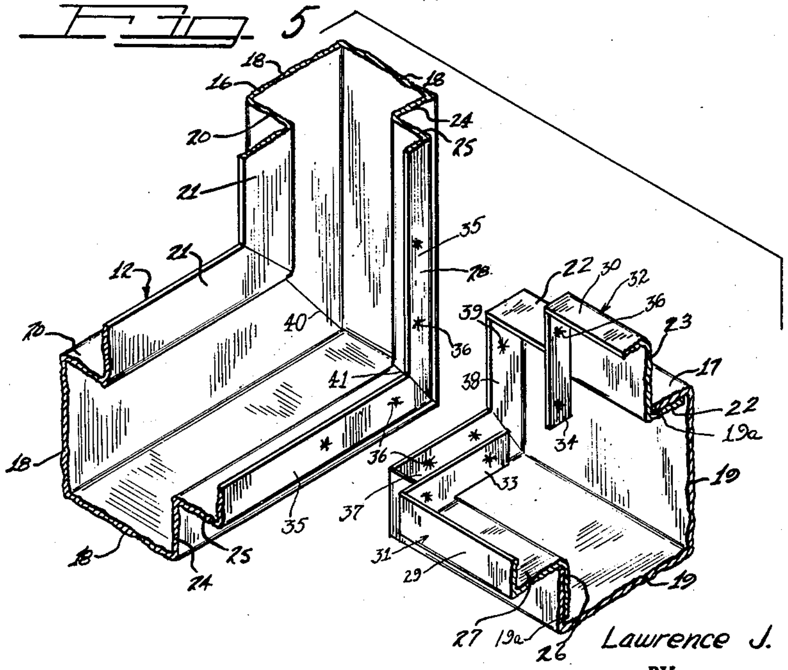
FIGURE 5 is an enlarged fragmentary exploded view of one of the corners of the enclosure.
Figure 6:
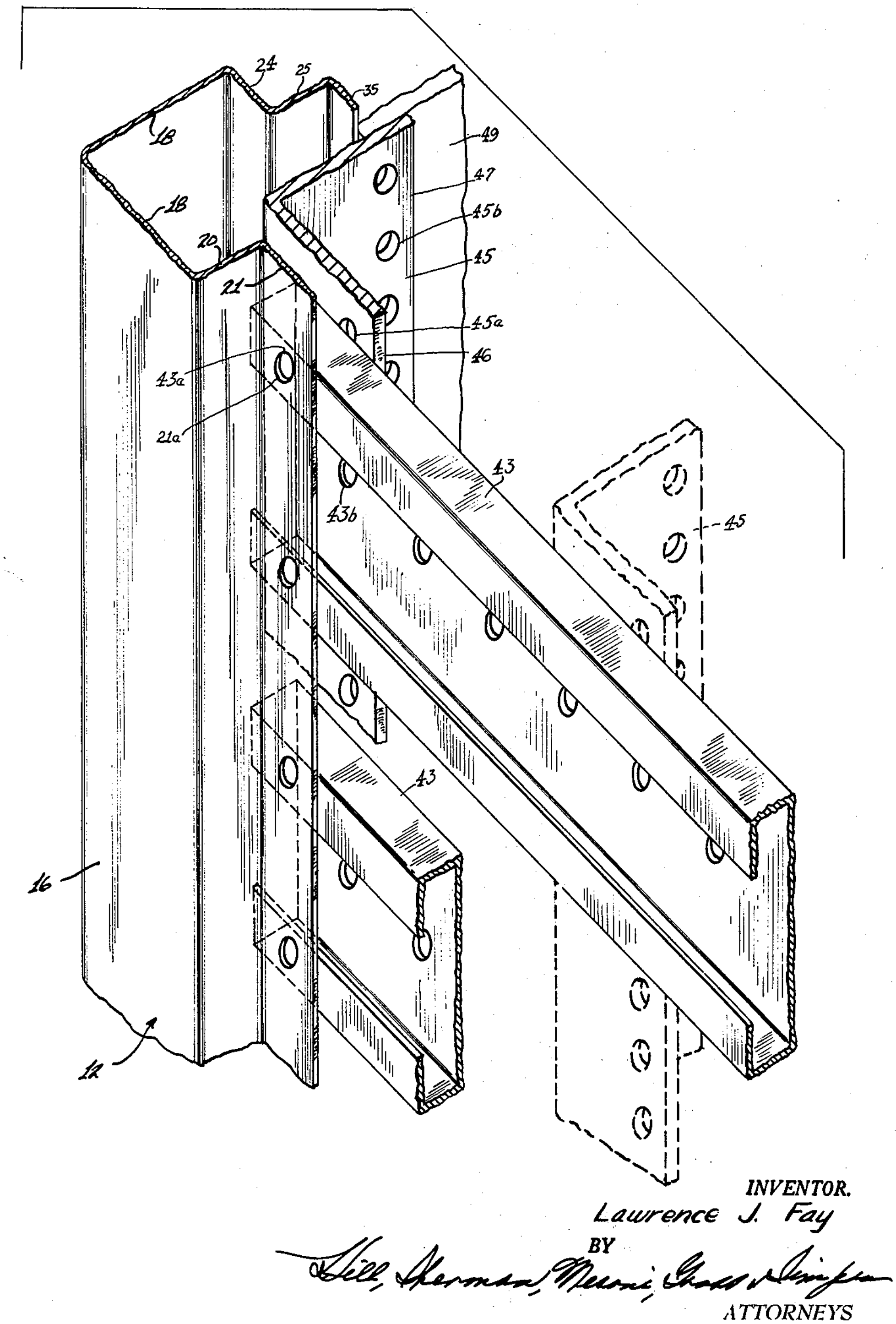
FIGURE 6 is an enlarged fragmentary exploded view of one of the side walls of the enclosure.

In FIGURE 7, a modified enclosure or cabinet 10' is illustrated. This cabinet 10' includes an upright frame 15' which is identical to the frame 16. A door 14' is mounted on the enclosure 10' in the same way as previously described. Sealing means illustrated in the form of a gasket 55 is attached to upright flange 25'. This gasket extends entirely about the rectangular flange 25' so that when the door 14' is in a closed position, the cabinet may be rendered moisture and dust proof. The other top, bottom, and side panels may be sealed in the same manner. No other known metal cabinet is capable of being converted so that it can be rendered substantially moisture and dust proof merely by the installation of sealing means between the panels and the panel seats. It will be appreciated, where certain types of specialized equipment are stored in the cabinets, that the user may wish the cabinet to be moisture and dust proof to prevent damage to the content. This cabinet may be manufactured initially with the gaskets or the gaskets may be installed at some later time, as desired. Other known types of electrical equipment cabinets cannot be readily converted and rendered substantially moisture and dust proof without substantially reconstructing the cabinet. The present cabinet due to its unique construction can be rendered substantially moisture and dust proof merely by securing gaskets to the panel seats.

Another advantage of the present cabinet is that all of its component parts including the base have been constructed in accordance with RTMA standards which require the dimensions of the equipment panels to vary in multiples of 1¾ inches. Thus, the equipment panels may be installed on any side of the cabinet, as desired.

While the preferred embodiments of the present invention have been shown and described herein it is obvious that many structural details may be changed without departing from the spirit and scope of the appended claims.

I claim as my invention:

1. An enclosure for equipment to be mounted therein, an enclosure frame including upright rectangular corner frame members spaced apart and disposed generally in parallel planes, said upright corner frame members extending about sides, top and bottom of the enclosure, and transverse frame members disposed between said upright corner frame members in assembly therewith at the area of each of their four corners, said transverse frame members each having its opposite ends disposed in endwise fitted engagement about the associated opposite corners of the spaced rectangular frame members, each of said frame members being hollow having diverging side frame portions open at an inner corner which corner is further defined by outer and inner pairs of angular relatively narrow stepped flanges generally at right angles to each other with said pairs of angular relatively stepped flanges being connected to said side frame portions, the inner and outer pairs of said narrow stepped flanges on said upright corner frame members and transverse members defining seats for edges of cabinet panels, the pairs of angular relatively narrow stepped flanges on said upright and transverse frame members at enclosure frame corners of said frame being fitted together and comprising means by which the upright and transverse frame members are secured together so as to be substantially free of torsional twisting and movement out of normal planes.

2. An enclosure for equipment to be mounted therein, an enclosure frame including upright rectangular corner frame members spaced apart and disposed generally in parallel planes, said upright corner frame members extending about sides, top and bottom of the enclosure, and transverse frame members disposed between said upright corner frame members in assembly therewith at the area of each of their four corners, said transverse frame members each having its opposite ends disposed in endwise fitted engagement about the associated opposite corners of the spaced rectangular frame members, each of said frame members being hollow having diverging side frame portions open at an inner corner which corner is further defined by outer and inner sets of angular relatively narrow stepped flanges generally at right angles to each other with said sets of angular relatively stepped flanges being connected to said side frame portions, the sets of angular relatively narrow stepped flanges on said upright and transverse frame members at enclosure frame corners of said frame being fitted together and comprising means by which the upright and transverse frame members are secured together so as to be substantially free of torsional twisting and movement out of normal planes, each of said sets of stepped flanges on said transverse members having welding frame flanges secured thereto and disposed at right angles to one another, the welding flanges at opposite ends of the transverse frame members being attached to said sets of stepped flanges on said upright corner frame member.

3. An enclosure for equipment to be mounted therein, an enclosure frame including upright rectangular corner frame members spaced apart and disposed generally in parallel planes, said upright corner frame members extending about sides, top and bottom of the enclosure, transverse frame members disposed between said upright corner frame members in assembly therewith at the area of each of their four corners, said transverse frame members each having its opposite ends disposed in endwise fitted engagement about the associated opposite corners of the spaced rectangular frame members, each of said frame members being hollow having diverging side frame portions open at an inner corner which corner is further defined by outer and inner pairs of angular relatively narrow stepped flanges generally at right angles to each other with said pairs of angular relatively stepped flanges being connected to said side frame portions, the pairs of angular relatively narrow stepped flanges on said upright and transverse frame members at enclosure frame corners of said frame being fitted together and comprising means by which the upright and transverse frame members are secured together so as to be substantially free of torsional twisting and movement out of normal planes, each of said upright frame members having transversely extending hanger members secured with spaced upright portions of said outer pairs of stepped flanges, an upright equipment panel hanger angle secured to said hanger members on each of said frame members, and an equipment panel secured in assembly at its opposite edges with said equipment panel hanger angles.

4. An enclosure for equipment to be mounted therein, an enclosure frame including upright rectangular corner frame members spaced apart and disposed generally in parallel planes, said upright corner frame members extending about sides, top and bottom of the enclosure, transverse frame members disposed between said upright corner frame members in assembly therewith at the area of each of their four corners, said transverse frame members each having its opposite ends disposed in endwise fitted engagement about the associated opposite corners of the spaced rectangular frame members, each of said frame members being hollow having diverging side frame portions open at an inner corner which corner is further defined by outer and inner pairs of angular relatively narrow stepped flanges generally at right angules to each other with said pairs of angular relatively stepped flanges being connected to said side frame portions, the pairs of angular relatively narrow stepped flanges on said upright and transverse frame members at enclosure frame corners of said frame being fitted together and comprising means by which the upright and transverse frame members are secured together so as to be substantially free of torsional twisting and movement out of normal planes, each of said upright frame members having transversely extending hanger members secured with spaced upright portions of said outer pairs of stepped flanges, an upright equipment panel hanger angle secured to said hanger members on each of said frame members, and an equipment panel secured in assembly at its opposite edges with said equipment panel hanger angles, the hanger members having transversely spaced openings so that the equipment panel hanger angles and the equipment panel can be moved to various adjusted positions depending on the transverse dimension of said equipment panel.

5. An enclosure for equipment to be mounted therein, an enclosure frame including upright rectangular corner frame members spaced apart and disposed generally in parallel planes, said upright corner frame members extending about sides, top and bottom of the enclosure, transverse frame members disposed between said upright corner frame members in assembly therewith at the area of each of their four corners, said transverse frame members each having its opposite ends disposed in endwise fitted engagement about the associated opposite corners of the spaced rectangular frame members, enclosure panels carried on said enclosure, each of said frame members being hollow having diverging side frame portions open at an inner corner which corner is further defined by outer and inner pairs of angular relatively narrow stepped flanges generally at right angles to each other with said pairs of angular relatively stepped flanges being connected to said side frame portions, the pairs of said narrow stepped flanges on said upright corner frame members and transverse members defining seats for edges of cabinet panels, the inner pairs of angular relatively narrow stepped flanges on said upright and transverse frame members at enclosure frame corners of said frame being fitted together and comprising means by which the upright and transverse frame members are secured together so as to be substantially free of torsional twisting and movement out of normal planes, and sealing means between said enclosure panels and said outer stepped flanges rendering the enclosure substantially dust and moisture proof.

6. An enclosure for equipment to be mounted therein, an enclosure frame including upright rectangular corner frame members spaced apart and disposed generally in parallel planes, said upright corner frame members extending about sides, top and bottom of the enclosure, and transverse frame members disposed between said upright corner frame members in assembly therewith at the area of each of their four corners, said transverse frame members each having its opposite ends disposed in endwise fitted engagement about the associated opposite corners of the spaced rectangular frame members, each of said frame members being hollow having diverging side frame portions open at an inner corner which corner is further defined by outer and inner pairs of angular relatively narrow stepped flanges generally at right angules to each other with said pairs of angular relatively stepped flanges being connected to said side frame portions, said narrow stepped flanges on said upright corner frame members and transverse members defining a seat for edges of a cabinet panel, the pairs of angular relatively narrow stepped flanges on said upright and transverse frame members at enclosure frame corners of said frame being fitted together and comprising means by which the upright and transverse frame members are secured together so as to be substantially free of torsional twisting and movement out of normal planes, each of said upright corner frame members comprising a strip defining continuous unbroken channel having right angle corners with opposite ends of the strip being integrally joined together.

7. In a cabinet construction requiring corner posts substantially free of torsional twisting and movement out of normal planes, each of said posts comprising a parallel sided hollow one piece channeled member having spaced longitudinal sides open at an inner corner area which opening is defined by divergent relatively narrow longitudinal flanges generally at right angles to each other and each being at right angles to one of said sides to which it is connected, said hollow one-piece channeled member defining a continuous annular channel opening internally thereof, each narrow flange defining with the longitudinal side connected thereto a seat for an edge of a cabinet panel, said corner post being generally in the form of an open rectangular frame for extending around the sides, top and bottom of a cabinet, and having four corners, the tubular member having longitudinally spaced notched areas to permit the one piece tubular member to be bent into rectangular form, means joining opposite ends of said channeled member in unitary assembly, and transverse frame members engaged between four corners of said parallel sided hollow one piece channeled members and with said frame members having means at its opposite ends secured and fitting about the associated corners of said frame members.

8. A cabinet having corner posts substantially free of torsional twisting and movement out of normal planes, each of said posts comprising a hollow one piece tubular member having spaced longitudinal sides open at an inner corner area which opening is defined by divergent relatively narrow longitudinal flanges generally at right angles to each other and each being at right angles to one of said sides to which it is connected, each narrow flange defining with the longitudinal side connected thereto a seat for an edge of a cabinet panel, said corner post being generally in the form of an open rectangular frame for extending around the sides, top and bottom of a cabinet, said rectangular frames being joined together by transverse members disposed at top and bottom ends of the cabinet, transverse struts connected at opposite ends to said flanges for joining said frames together, longitudinal angles having flanges secured to said transverse struts, an equipment panel disposed between said frames and secured to the cabinet by its connection with said angles, and means between said angles and said panel permitting said panel to be moved back and forth in said cabinet to accommodate equipment of different sizes behind said panel.

9. A cabinet having a frame defined by upright and transverse frame members which are joined together so the frame is substantially free of torsional twisting and movement out of normal planes, each of said frame members comprising a hollow channel-type member having spaced sides open at an inner corner area which opening is defined at opposite sides by divergent relatively narrow rectangularly shaped flanges generally at right angles to each other, the flanges defining a series of seats each for an outer peripheral margin of a cabinet panel, said upright member being generally in rectangular form for extending clear around the sides, top and bottom of a cabinet, said rectangular frames being joined together by the transverse members disposed at top and bottom ends of the cabinet, and top, bottom and side panels each of which is seated on said seats in removable assembly with the frame, the transverse frame members each having means at its opposite ends secured in endwise fitted engagement about associated opposite corners of said rectangularly shaped flanges on said upright frame members.

10. A cabinet having a frame defined by upright and transverse frame members which are joined together so the frame is substantially free of torsional twisting and movement out of normal planes, each of said frame members comprising a hollow tubular member having spaced sides open at an inner corner area which opening is defined at opposite sides by divergent relatively narrow longitudinal flanges generally at right angles to each other, the flanges defining a series of seats each for an outer peripheral margin of a cabinet panel, said upright member being generally in rectangular form for extending clear around the sides, top and bottom of a cabinet, said rectangular frames being joined together by the transverse members disposed at top and bottom ends of the cabinet, top, bottom and side panels each of which is seated on said seats in removable assembly with the frame, transverse struts connected at opposite ends thereof to said flanges on said upright members for joining said frames together, longitudinal angles having flanges secured to said transverse struts, an equipment panel disposed between said frames and secured to the cabinet by its connection with said angles, and means between said angles and said panel permitting said panel to be moved back and forth in said cabinet to accommodate equipment of different sizes behind said panel.

11. A cabinet having a frame defined by upright and transverse frame members which are joined together so the frame is substantially free of torsional twisting and movement out of normal planes, each of said frame members comprising a hollow tubular member having spaced sides open at an inner corner area which opening is defined at opposite sides by divergent relatively narrow longitudinal flanges generally at right angles to each other, the flanges defining a series of seats each for an outer peripheral margin of a cabinet panel, said upright member being generally in rectangular form for extending around the sides, top and bottom of a cabinet, said hollow one-piece channeled member defining a continuous annular channel opening internally thereof, said rectangular frames being joined together by the transverse members disposed at top and bottom ends of the cabinet, top, bottom and side panels each of which is seated on said seats in removable assembly with the frame, and sealing gaskets carried by each of said seats so that when the panels are engaged on said seats, the cabinet is rendered moisture and dust proof.

12. A cabinet having a frame defined by upright and transverse frame members which are joined together so the frame is substantially free of torsional twisting and movement out of normal planes, each of said frame members comprising a hollow tubular member having spaced sides open at an inner corner area which opening is defined at opposite sides by divergent relatively narrow longitudinal flanges generally at right angles to each other, the flanges defining a series of seats each for an outer peripheral margin of a cabinet panel, said upright member being generally in rectangular form for extending around the sides, top and bottom of a cabinet, said hollow one-piece channeled member defining a continuous annular channel opening internally thereof, said rectangular frames being joined together by the transverse members disposed at top and bottom ends of the cabinet, and top, bottom and side panels each of which is seated on said seats in removable assembly with the frame, the frame members each being formed from a strip having spaced notched areas disposed along the length of the strip, the strip being bent at the notched areas across one of the sides providing the frame member with four corners and with the opposite ends of the strip being secured in unitary assembly.

13. A cabinet having a frame defined by upright rectangular frame members and transverse frame members which frame members are joined together so the frame is substantially free of torsional twisting and movement out of normal planes, each of said frame members comprising a hollow tubular member having spaced rectangular sides open at an inner corner area which opening is defined at opposite sides by relatively narrow rectangular seat flanges generally at right angles to each other, the flanges extending away from the sides to which they are attached and define a series of seats each for an outer peripheral margin of a cabinet panel, joint means joining said rectangular frames with the transverse members at the corners of the upright rectangular frame members, and top, bottom and side panels each of which is seated on said seats in removable assembly with the frame, an offset rectangular flange angularly turned behind an innermost of the rectangular seat flanges on an inner side of said transverse frame member and together comprising an inner corner, the transverse members each having angular end closure flanges disposed at opposite ends of the sides of said transverse member, welding flanges being angularly related to one another and in a plane generally parallel to the plane of the end closure flanges, the welding flanges being inset relative to the closure flanges at each end of the transverse members defining an inner corner pocket area and with said inner corner being retainingly secured in said inner corner pocket area comprising said joint means and providing a reinforced connection between the upright and transverse frame members.

14. A corner joint for a sheet metal equipment enclosure including a generally right angular channeled frame member of strip stock including angularly related frame portions, the frame member having a continuous angular frame strip portion joining the frame portions together and providing a channeled juncture corner at the intersection of said frame portions, the frame portions having stepped sides providing ledges offset and disposed in parallel planes with respect to one another and extending at right angles around the channeled juncture corner at one side thereof, and a channeled transverse frame member comprised of strip stock having means including flanges on its end disposed generally at right angles to the transverse frame member and secured in face to face engagement with said ledges on said frame portions about said juncture corner of said right angular channeled frame member whereby the frame members are provided with a sway-resistant reinforced joint at their juncture.

15. A corner joint for an equipment enclosure including a generally right angular channeled frame member including angularly related frame portions, the frame member having a continuous angular frame strip portion joining the frame portions together and providing a channeled juncture corner at the intersection of said frame portions, the frame portions having a stepped side margin providing ledges offset and disposed in parallel planes with respect to one another and extending at right angles around the juncture corner at one side thereof, and a channeled transverse frame member having means including flanges on its end disposed generally at right angles to the transverse frame member and secured in face to face engagement with said ledges on said frame portions about said juncture corner of said right angular channeled frame member whereby the frame members are provided with a sway-resistant double ledge, double plane reinforced joint at their juncture.

16. A corner joint for a sheet metal equipment enclosure including a generally right angular channeled frame member of strip stock including angularly related frame portions, the frame member having a juncture corner at the intersection of said frame portions, the angular frame portions each having a stepped side margin providing ledges offset and disposed in parallel planes with respect to one another, said ledges extending at right angles around the juncture corner at one side thereof, and channeled transverse frame member having means including flanges on its end disposed generally at right angles to the channeled transverse frame member and secured in face to face engagement with said ledges on said frame portions about said juncture corner of said right angular channeled frame member whereby the frame members are provided with a sway-resistant reinforced joint at their juncture.

17. The corner joint of claim 16 further characterized by said flanges on said channeled transverse frame member comprising angularly related channel end closure flanges and angularly related welding flanges disposed in inset relation on the transverse frame member with respect to the channel end closure flanges.

References Cited in the file of this patent

UNITED STATES PATENTS

| | | |
|---|---|---|
| 1,178,612 | Weiss | Apr. 11, 1916 |
| 2,167,525 | Rosendale | July 25, 1939 |
| 2,411,121 | Wilson | Nov. 12, 1946 |
| 2,714,546 | Lesniak | Aug. 2, 1955 |
| 2,902,328 | Auer | Sept. 1, 1959 |
| 2,914,294 | Wells et al. | Nov. 10, 1959 |
| 2,977,629 | Wolski | Aug. 22, 1961 |